United States Patent [19]

Petrzelka

[11] Patent Number: 5,727,658
[45] Date of Patent: Mar. 17, 1998

[54] TRAIN WHEEL ROLL PRECLUDING DEVICE

[76] Inventor: Toby J. Petrzelka, P.O. Box 77404, Seattle, Wash. 98177

[21] Appl. No.: 670,264

[22] Filed: Jun. 21, 1996

[51] Int. Cl.[6] .................................................. B60F 25/00
[52] U.S. Cl. .................................................. 188/36; 188/32
[58] Field of Search .............................. 188/32, 36, 4 R, 188/5

[56] References Cited

U.S. PATENT DOCUMENTS

| | | | |
|---|---|---|---|
| 770,510 | 9/1904 | Stullken | 188/32 |
| 2,817,301 | 12/1957 | Tregoning | 188/36 |
| 2,820,421 | 1/1958 | Merritt | 188/36 |
| 3,684,060 | 8/1972 | Wadde | 188/36 |
| 4,031,726 | 6/1977 | De Jager | 188/32 |
| 4,804,070 | 2/1989 | Bohler | 188/32 |
| 5,410,897 | 5/1995 | Edmondson | 188/32 |
| 5,553,987 | 9/1996 | Ellis | 188/32 |

FOREIGN PATENT DOCUMENTS 485558  12/1953  Italy ......................... 188/32

Primary Examiner—Matthew C. Graham

[57] ABSTRACT

A train brake device including a chocking member dimensioned for positioning around a train wheel is disclosed. A gear assembly is secured to a rear face of the chocking member. A rail clamping assembly is positioned beneath a rail of a train track and extends upwardly through the gear assembly for engagement therewith. A pawl is secured within the gear assembly for selective engagement therewith. The main usage of the present invention is for positioning around work equipment. When in place around a train wheel, the present invention will prevent injury to train crew members by blocking and preventing the wheel from rolling. This is especially important when no cabooses are present and crew members must place flashing red lights on the rear of the train.

7 Claims, 3 Drawing Sheets

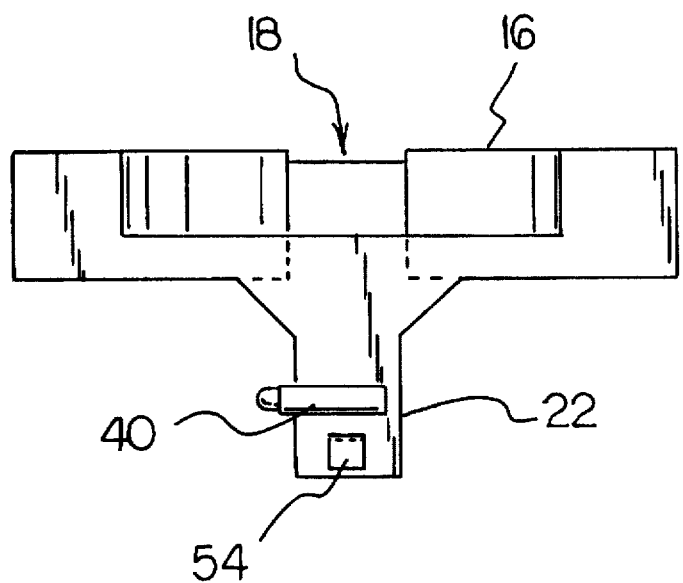
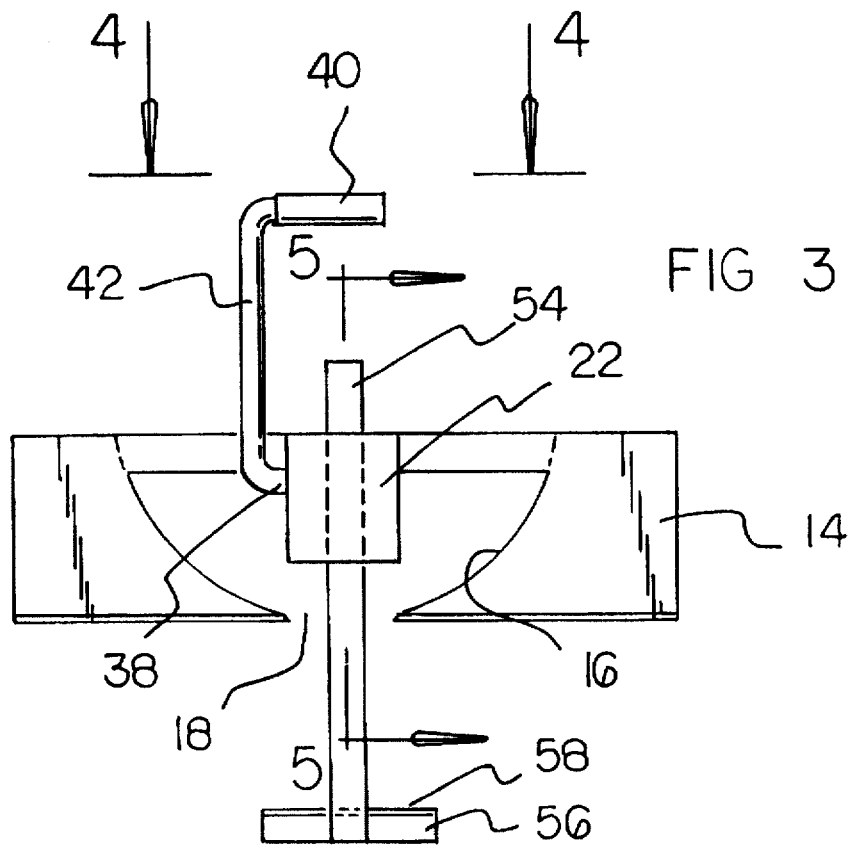

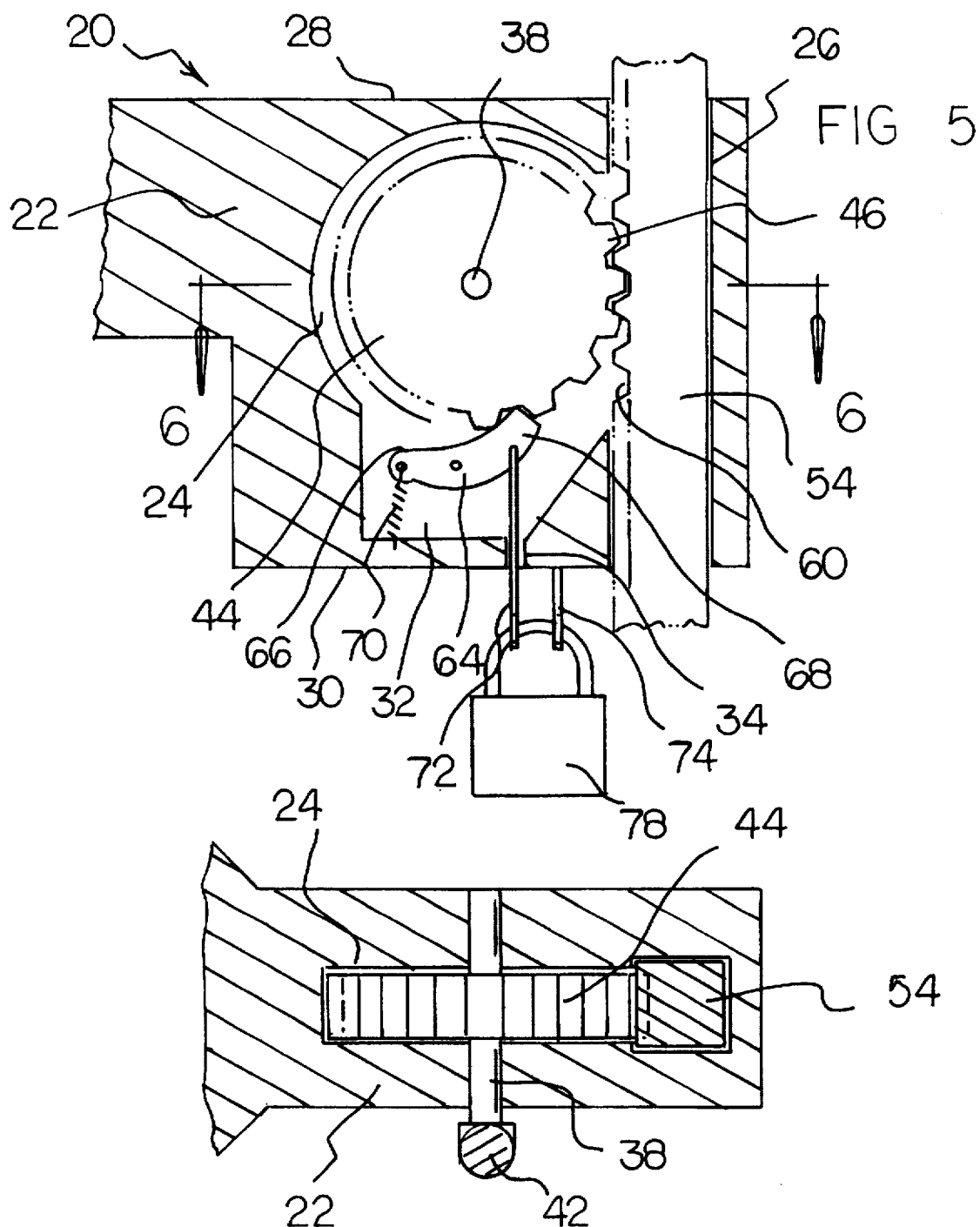

TRAIN WHEEL ROLL PRECLUDING DEVICE

BACKGROUND OF THE INVENTION

1. Field of the Invention

The present invention relates to a train brake device and more particularly pertains to immobilizing a wheel of a train thereby preventing the train from rolling with a train brake device.

2. Description of the Prior Art

The use of wheel immobilizers is known in the prior art. More specifically, wheel immobilizers heretofore devised and utilized for the purpose of immobilizing a wheel are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,955,459 to Murphy discloses a strapless wheel chocking assembly.

U.S. Pat. No. 4,649,724 to Raine discloses a vehicle immobilization device.

U.S. Pat. No. 4,833,442 to Von Heck discloses a wheel immobilizer-chock w/integral latch and alarm.

U.S. Pat. No. 4,828,076 to Fox discloses a lock chock for tandem axle wheels.

U.S. Pat. No. 4,979,856 to Blunden et al. discloses a vehicle cantilever chock block apparatus for railroad car transport of vehicles.

U.S. Pat. No. 4,368,648 to Housman et al. discloses a hand brake for railroad car.

While these devices fulfill their respective, particular objective and requirements, the aforementioned patents do not describe a train brake device for immobilizing a wheel of a train thereby preventing the train from rolling.

In this respect, the train brake device according to the present invention substantially departs from the conventional concepts and designs of the prior art, and in doing so provides an apparatus primarily developed for the purpose of immobilizing a wheel of a train thereby preventing the train from rolling.

Therefore, it can be appreciated that there exists a continuing need for new and improved train brake device which can be used for immobilizing a wheel of a train thereby preventing the train from rolling. In this regard, the present invention substantially fulfills this need.

SUMMARY OF THE INVENTION

In the view of the foregoing disadvantages inherent in the known types of wheel immobilizers now present in the prior art, the present invention provides an improved train brake device. As such, the general purpose of the present invention, which will be described subsequently in greater detail, is to provide a new and improved train brake device and method which has all the advantages of the prior art and none of the disadvantages.

To attain this, the present invention essentially comprises a chocking member comprised of a housing having an open semi-circular front face dimensioned for positioning around a train wheel. A lower face of the housing has an opening therethrough radially disposed within the open semi-circular front face. A gear assembly is provided that is comprised of a housing secured to a rear face of the housing of the chocking member. The housing has a circular chamber formed therein. A channel extends through the housing from an upper face through a lower face thereof tangential to the circular chamber. A lower chamber is tangentially disposed below the circular chamber. An aperture extends through the lower face of the housing into the lower chamber. A handle is provided having a lower end extending horizontally within the circular chamber. An upper end of the handle is disposed above the gear assembly. An intermediate vertical member extends between the lower end and the upper end. A gear is rotatably coupled to the lower end of the handle within the circular chamber. The gear has a plurality of teeth formed thereon. The device includes a rail clamping assembly comprised of an L-shaped member. The L-shaped member has a vertical upper portion and a horizontal lower portion. The horizontal lower portion has a generally triangular configuration. The horizontal lower portion is positioned beneath a rail of a train track. The horizontal lower portion has a rubber layer disposed on an upper surface thereof. The vertical upper portion extends upwardly through the channel of the housing of the gear assembly. The vertical upper portion has a plurality of teeth formed in an inner surface thereof for engagement with the plurality of teeth of the gear. The device includes a pawl having an upper end and a lower end. The pawl is pivotally secured within the lower chamber of the housing of the gear assembly. The lower end has a spring extending downwardly therefrom for securement to a lower surface of the lower chamber. The spring biases the lower end of the pawl downwardly thereby biasing the upper end upwardly to engage the plurality of teeth of the gear of the gear assembly. The upper end has a locking tab extending downwardly therefrom outwardly of the aperture in the lower face of the housing of the gear assembly. The mounting tab aligns with a matching tab on the lower face of the housing of the gear assembly whereby apertures therethrough are aligned. A padlock extends through the aligned apertures of the mounting tab and the matching tab.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved train brake device which has all the advantages of the prior art wheel immobilizers and none of the disadvantages.

It is another object of the present invention to provide a new and improved train brake device which may be easily and efficiently manufactured and marketed.

It is a further object of the present invention to provide a new and improved train brake device which is of durable and reliable construction.

An even further object of the present invention is to provide a new and improved train brake device which is susceptible of a low cost of manufacture with regard to both materials and labor, and which accordingly is then susceptible of low prices of sale to the consuming public, thereby making such a train brake device economically available to the buying public.

Even still another object of the present invention is to provide a new and improved train brake device for immobilizing a wheel of a train thereby preventing the train from rolling.

Lastly, it is an object of the present invention to provide a new and improved train brake device including a chocking member dimensioned for positioning around a train wheel. A gear assembly is secured to a rear face of chocking member. A rail clamping assembly is positioned beneath a rail of a train track and extending upwardly through the gear assembly for engagement therewith. A pawl is secured within the gear assembly for selective engagement therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevation view of the present invention.

FIG. 4 is a plan view of the present invention as taken along line 4—4 of FIG. 3.

FIG. 5 is a cross-sectional view as taken along line 5—5 of FIG. 3.

FIG. 6 is a cross-sectional view as taken along line 6—6 of FIG. 5.

The same reference numerals refer to the same parts through the various Figures.

DESCRIPTION OF THE PREFERRED EMBODIMENT

Figure 1:
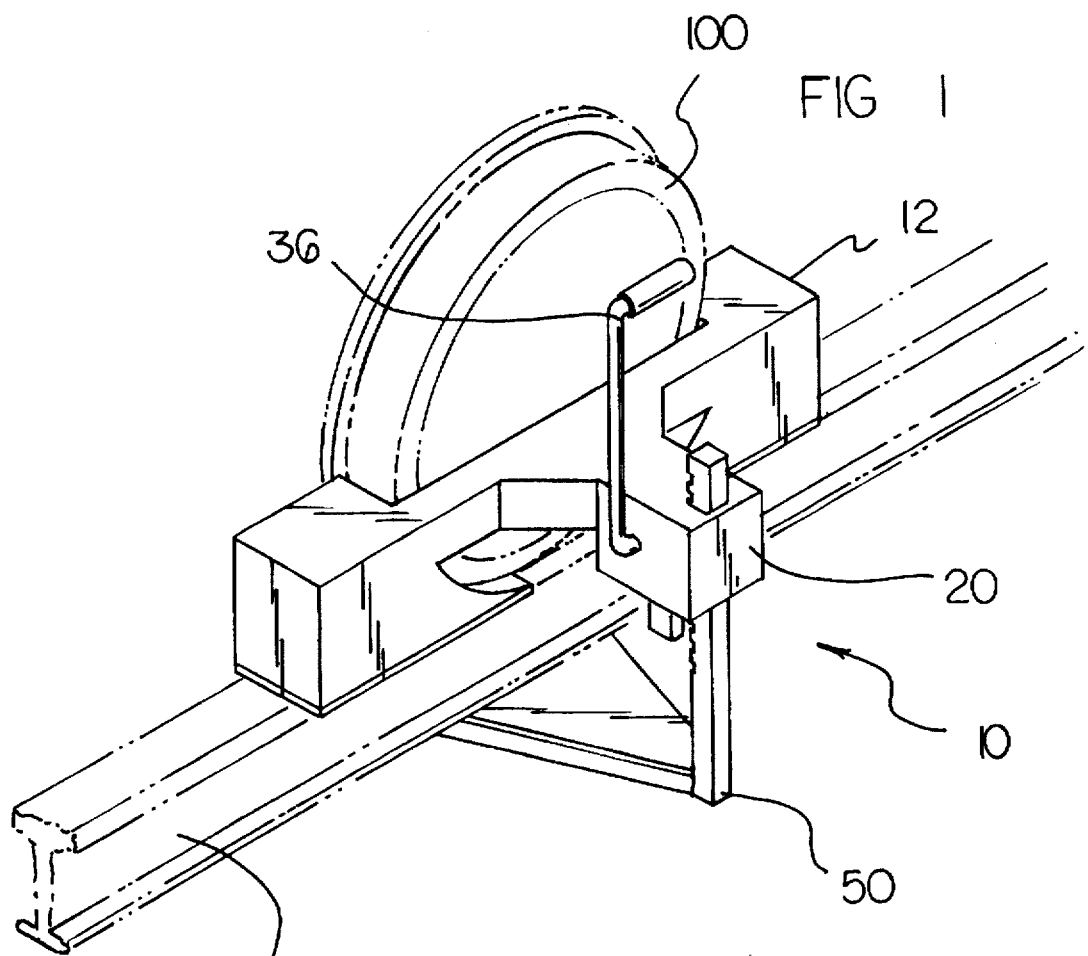
FIG. 1 is a perspective view of the preferred embodiment of the train brake device constructed in accordance with the principles of the present invention.
Figure 2:
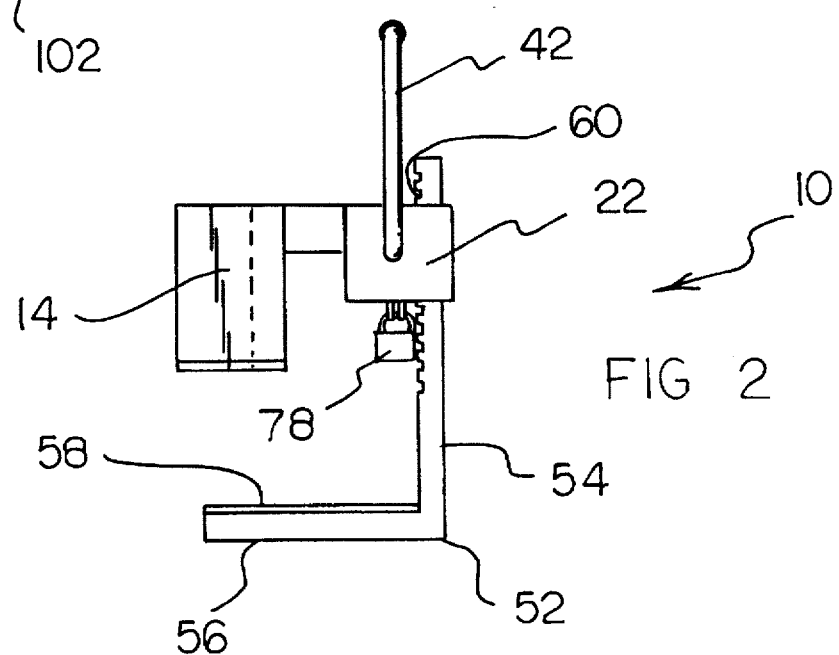
FIG. 2 is a side elevation view of the present invention.

With reference now to the drawings, and in particular, to FIGS. 1-6 thereof, the preferred embodiment of the new and improved train brake device embodying the principles and concepts of the present invention and generally designated by the reference number 10 will be described.

Specifically, it will be noted in the various Figures that the device relates to a train brake device for immobilizing a wheel of a train thereby preventing the train from rolling. In its broadest context, the device consists of a chocking member, a gear assembly, a rail clamp assembly, a pawl, and a padlock. Such components are individually configured and correlated with respect to each other so as to attain the desired objective.

The device 10 includes a chocking member 12 comprised of a housing 14 having an open semi-circular front face 16 dimensioned for positioning around a train wheel 100. A lower face of the housing 14 has an opening 18 therethrough radially disposed within the open semi-circular front face 16. The chocking member 12 can be simply put in place around the train wheel 100 with curved interior surfaces of the open semi-circular front face 16 positioned on opposing sides of the train wheel 100.

A gear assembly 20 is provided that is comprised of a housing 22 secured to a rear face of the housing 14 of the chocking member 12. The housing 22 has a circular chamber 24 formed therein. A channel 26 extends through the housing 22 from an upper face 28 through a lower face 30 thereof tangential to the circular chamber 24. A lower chamber 32 is tangentially disposed below the circular chamber 24. An aperture 34 extends through the lower face 30 of the housing 22 into the lower chamber 32. A handle 36 is provided having a lower end 38 extending horizontally within the circular chamber 24. An upper end 40 of the handle 36 is disposed above the gear assembly 20. An intermediate vertical member 42 extends between the lower end 38 and the upper end 40. A gear 44 is rotatably coupled to the lower end 38 of the handle 36 within the circular chamber 24. The gear 44 has a plurality of teeth 46 formed thereon.

Next, the device 10 includes a rail clamping assembly 50 comprised of an L-shaped member 52. The L-shaped member 52 has a vertical upper portion 54 and a horizontal lower portion 56. The horizontal lower portion 56 has a generally triangular configuration. The horizontal lower portion 56 is positioned beneath a rail 102 of a train track. The horizontal lower portion 56 has a rubber layer 58 disposed on an upper surface thereof. The vertical upper portion 54 extends upwardly through the channel 26 of the housing 22 of the gear assembly 20. The vertical upper portion 54 has a plurality of teeth 60 formed in an inner surface thereof for engagement with the plurality of teeth 46 of the gear 44.

The device 10 also includes a pawl 64 having an upper end 66 and a lower end 68. The pawl 64 is pivotally secured within the lower chamber 32 of the housing 22 of the gear assembly 20. The lower end 68 has a spring 70 extending downwardly therefrom for securement to a lower surface of the lower chamber 32. The spring 70 biases the lower end 68 of the pawl 64 downwardly thereby biasing the upper end 66 upwardly to engage the plurality of teeth 46 of the gear 44 of the gear assembly 20. The upper end 66 has a locking tab 72 extending downwardly therefrom outwardly of the aperture 34 in the lower face 30 of the housing 22 of the gear assembly 20. The mounting tab 72 aligns with a matching tab 74 on the lower face 30 of the housing 22 of the gear assembly 20 whereby apertures therethrough are aligned.

Lastly, a padlock 78 extends through the aligned apertures of the mounting tab 72 and the matching tab 74.

The present invention is easy to use. The chocking assembly 12 is coupled with the train wheel 100 while the horizontal lower portion 56 is positioned beneath the rail 102. The user then cranks the handle 36 so that the vertical upper portion 54 raises through the channel 26 via the gear 44. Once the vertical upper portion 54 is raised as far as it can go, the pawl 64 will engage the teeth 46 on the gear 44 to prevent backward rotation of the gear. The padlock 78 can be put in place to provide a further safety measure.

The present invention is a specially-designed wheel stop to insure workers' safety while performing maintenance on steel-wheeled modes of transportation—trains, subway trains and trolleys. The present invention will block and prevent the wheel from rolling, saving workers from hand and finger injuries, and protect rail companies from resulting compensation claims and lawsuits.

The present invention clamps and locks onto the lip of the rail quickly and easily. The chocking member 12 fits between the curve of the wheel and the rail. The rubber layer 58 provides additional anti-roll protection. Installation does not require an operator to place his hands in the danger zone beneath the wheel, as with common anti-roll methods.

The padlock 78 allows the device 10 to be locked in place to provide additional railway security.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A train brake device for preventing a wheel of a train thereby preventing the train from rolling comprising, in combination:

a chocking member comprised of a housing having an open semi-circular front face dimensioned for positioning around a train wheel, a lower face of the housing having an opening therethrough radially disposed within the open semi-circular front face;

a gear assembly comprised of a housing secured to a rear face of the housing of the chocking member, the housing having a circular chamber formed therein, a channel extends through the housing from an upper face through a lower face thereof tangential to the circular chamber, a lower chamber tangentially disposed below the circular chamber, an aperture extending through the lower face of the housing into the lower chamber, a handle having a lower end extending horizontally within the circular chamber, an upper end of the handle disposed above the gear assembly, an intermediate vertical member extending between the lower end and the upper end, a gear rotatably coupled to the lower end of the handle within the circular chamber, the gear having a plurality of teeth formed thereon;

a rail clamping assembly comprised of an L-shaped member, the L-shaped member having a vertical upper portion and a horizontal lower portion, the horizontal lower portion having a generally triangular configuration, the horizontal lower portion positioned beneath a rail of a train track, the horizontal lower portion having a rubber layer disposed on an upper surface thereof, the vertical upper portion extending upwardly through the channel of the housing of the gear assembly, the vertical upper portion having a plurality of teeth formed in an inner surface thereof for engagement with the plurality of teeth of the gear;

a pawl having an upper end and a lower end, the pawl pivotally secured within the lower chamber of the housing of the gear assembly, the lower end having a spring extending downwardly therefrom for securement to a lower surface of the lower chamber, the spring biasing the lower end of the pawl downwardly thereby biasing the upper end upwardly to engage the plurality of teeth of the gear of the gear assembly, the upper end having a locking tab extending downwardly therefrom outwardly of the aperture in the lower face of the housing of the gear assembly, the mounting tab aligning with a matching tab on the lower face of the housing of the gear assembly whereby apertures therethrough are aligned; and a padlock extending through the aligned apertures of the mounting tab and the matching tab.

2. A train brake device comprising:

a chocking member dimensioned for positioning around a train wheel;

a gear assembly secured to a rear face of the chocking member;

a rail clamping assembly positioned beneath a rail of a train track and extending upwardly through the gear assembly for engagement therewith;

a pawl secured within the gear assembly for selective engagement therewith, the pawl having an upper end and a lower end, the pawl pivotally secured within a lower chamber of a housing of the gear assembly, the lower end having a spring extending downwardly therefrom for securement to a lower surface of the lower chamber, the spring biasing the lower end of the pawl downwardly thereby biasing the upper end upwardly to engage a plurality of teeth of the gear assembly, the upper end having a locking tab extending downwardly therefrom outwardly of an aperture in the lower face of the housing of the gear assembly, the mounting tab aligning with a matching tab on the lower face of the housing of the gear assembly whereby apertures therethrough are aligned.

3. The train brake assembly as set forth in claim 2 and further including a padlock extending through the aligned apertures of the mounting tab and the matching tab.

4. A train brake device comprising:

a chocking member dimensioned for positioning around a train wheel;

a gear assembly secured to a rear face of the chocking member, the gear assembly comprised of a housing secured to a rear face of the chocking member, the housing having a circular chamber formed therein for, a channel extends through the housing from an upper face through a lower face thereof tangential to the circular chamber, a lower chamber tangentially disposed below the circular chamber, an aperture extends through the lower face of the housing into the lower chamber, a handle having a lower end extending horizontally within the circular chamber, an upper end of the handle disposed above the gear assembly, an intermediate vertical member extending between the lower end and the upper end, a gear rotatably coupled to the lower end of the handle within the circular chamber, the gear having a plurality of teeth formed thereon;

a rail clamping assembly positioned beneath a rail of a train track and extending upwardly through the gear assembly for engagement therewith;

a pawl secured within the gear assembly for selective engagement therewith.

5. The train brake device as set forth in claim 4 wherein the rail clamping assembly is comprised of an L-shaped member, the L-shaped member having a vertical upper portion and a horizontal lower portion, the horizontal lower portion having a generally triangular configuration, the horizontal lower portion positioned beneath the rail of the train track, the vertical upper portion extending upwardly through the channel of the housing of the gear assembly, the vertical upper portion having a plurality of teeth formed in an inner surface thereof for engagement with the plurality of teeth of the gear.

6. The train brake device as set forth in claim 5 wherein the horizontal lower portion of the L-shaped member has a rubber layer disposed on an upper surface thereof.

7. The train brake device as set forth in claim 4 wherein the chocking member is comprised of a housing having an open semi-circular front face dimensioned for positioning around the train wheel, a lower face of the housing having an opening therethrough radially disposed within the open semi-circular front face.

* * * * *